(12) United States Patent
McCormick et al.

(10) Patent No.: US 7,963,444 B2
(45) Date of Patent: Jun. 21, 2011

(54) ARRANGEMENT FOR AND METHOD OF GUIDING AN OPERATOR TO MOVE AN IMAGING READER TO AN OPTIMUM READING POSITION

(75) Inventors: Dorothy McCormick, Farmingdale, NY (US); Miroslav Trajkovic, Centereach, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 455 days.

(21) Appl. No.: 12/220,334

(22) Filed: Jul. 23, 2008

(65) Prior Publication Data
US 2010/0019041 A1 Jan. 28, 2010

(51) Int. Cl.
*G09K 7/10* (2006.01)

(52) U.S. Cl. ............... 235/454; 235/462.08; 235/462.2; 235/462.21; 235/462.22; 235/462.32; 235/491

(58) Field of Classification Search ............... 235/454, 235/462.08, 462.2, 462.21, 462.22, 462.32, 235/491
See application file for complete search history.

(56) References Cited

U.S. PATENT DOCUMENTS

| | | | |
|---|---|---|---|
| 2003/0080193 A1* | 5/2003 | Ryan et al. | 235/491 |
| 2006/0043187 A1* | 3/2006 | He et al. | 235/462.2 |

* cited by examiner

*Primary Examiner* — Michael G Lee
*Assistant Examiner* — Kristy A Haupt

(57) ABSTRACT

An operator is guided to move an imaging reader to an optimum reading position in which to read a symbol by image capture. Optimum image capture occurs substantially at an imaging plane of an imaging assembly, and the operator is visually guided so that the symbol is located substantially at the imaging plane in a working range of distances.

6 Claims, 3 Drawing Sheets

ARRANGEMENT FOR AND METHOD OF GUIDING AN OPERATOR TO MOVE AN IMAGING READER TO AN OPTIMUM READING POSITION

BACKGROUND OF THE INVENTION

Solid-state imaging readers have been used in supermarkets, warehouse clubs, department stores, and other kinds of retailers to electro-optically read one-dimensional bar code symbols, particularly of the Universal Product Code (UPC) type, on products to be purchased, each symbol having a row of bars and spaces spaced apart along one direction, and also for processing two-dimensional symbols, such as Code 49, on such products, as well as other items. The structure of Code 49, which introduced the concept of vertically stacking a plurality of rows of bar and space patterns in a single symbol, is described in U.S. Pat. No. 4,794,239. Another two-dimensional code structure for increasing the amount of data that can be represented or stored on a given amount of surface area is known as PDF417 and is described in U.S. Pat. No. 5,304,786.

A typical imaging reader has an imaging assembly including a solid-state imager having a one- or two-dimensional array of cells or photosensors lying in a sensor plane, the photosensors corresponding to image elements or pixels in a field of view of the array, and imaging optics having an imaging plane at which, or in the proximity of which, an image of a symbol is optimally imaged and read. In optics, the imaging plane is a plane where the sharpest image of an object is formed by an imaging lens. Herein, the imaging plane is located in the object space, that is, where the symbol is located in a range of working distances relative to the imaging reader. The imaging plane or object (symbol) plane is conjugated to the sensor plane, which yields the sharpest image on the array. The image of the symbol at the conjugated distance projected on the array by the imaging optics is the sharpest and has the best possible quality for reading the symbol. The imaging assembly is similar to that used in a digital camera. The array may be a one- or two-dimensional charge coupled device (CCD) or a complementary metal oxide semiconductor (CMOS) device, together with associated circuits for producing electronic signals corresponding to a one- or two-dimensional array of pixel information over the field of view. A microprocessor is used to analyze and decode the captured image of the symbol. The array may be used for capturing a monochrome image of a symbol as, for example, disclosed in U.S. Pat. No. 5,703,349. The array may have multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

Yet, the use of an imaging reader, especially a handheld movable reader, for reading symbols located anywhere within a range of working distances relative to the reader has proven to be challenging. An operator cannot see exactly whether a symbol is within the field of view of the array during reading, or know whether the symbol is located at, or in close proximity to, the imaging plane, for optimum reading within the working range. This is especially true for reading a symbol of high density. The symbol must lay preferably entirely within the field of view, as well as at, or near, the imaging plane within the working range, to be successfully and rapidly imaged, decoded and read. It is not uncommon for the operator to repeatedly move the portable reader in multiple side-to-side, up-and-down, and back-and-forth, directions and repeatedly aim the portable reader at a single symbol several times before an indicator advises the operator that the symbol has been successfully imaged and read, thereby slowing down transaction processing and reducing productivity.

This blind aiming at the symbol is easier if the symbol is relatively small or is far away from the reader, because then the chances that the symbol will lay within the field of view are greater. However, in most cases, this blind aiming at the symbol is difficult to overcome, especially when the position and orientation of the symbol are variable, which is the case for most applications.

To help overcome this blind aiming problem, an aiming light arrangement is typically mounted in the reader, for projecting a visible aiming light pattern to visually target the symbol within the field of view and, thus, advise the operator which way the reader is to be moved in order to position the aiming light pattern on the symbol, typically at the center thereof, prior to reading. As advantageous as such aiming light arrangements are, they have proven to be less than satisfactory in certain situations. For example, the aiming light pattern does not typically provide information about how far from, or close to, the reader the symbol should be located for best reading performance. The aiming light pattern typically indicates the overall size of the field of view, but does not guide the operator to the imaging plane at which the symbol is best read. The aiming light arrangement is designed so that the aiming light pattern remains sharp and focused throughout the working range and, as a result, the operator is left with no guidance as to where the optimum reading distance is within the range.

SUMMARY OF THE INVENTION

One feature of the present invention resides, briefly stated, in a reader for, and a method of, electro-optically reading a symbol, especially one- or two-dimensional symbols, located in a range of working distances from the reader. The reader is preferably embodied as a portable, point-of-transaction, gun-shaped, handheld housing, but could be embodied as a handheld, box-shaped housing, or any other configuration. Prior to reading of the symbols, the reader is brought to, and aimed at, the symbols by an operator. In the preferred embodiment, the reader is installed in a retail establishment, such as a supermarket, but can be installed virtually anywhere requiring symbols to be read.

An imaging assembly is mounted in the reader and includes a one- or two-dimensional, solid-state imager under control of a controller, and an imaging lens comprised of one or more lens elements having an imaging plane. The imager includes an array of image sensors lying in a sensor plane and operative for capturing light from the symbol over a field of view, and for generating an electrical signal indicative of the captured light. Preferably, the array is a charge coupled device (CCD) or a complementary metal oxide semiconductor (CMOS) array. The imaging lens is preferably mounted in front of the imager to optically modify, focus and project the captured light onto the imager.

The imager may be associated with a high-speed strobe illuminator under control of the controller to enable the image of the symbol to be acquired in a very short period of time, for example, on the order of 500 microseconds, so that the symbol image is not blurred even if there is relative motion between the imager and the symbol. The strobe illumination is preferably brighter than ambient illumination. The illumination can also be continuous. The imager captures light over an exposure time period, also under the control of the controller. A short exposure time also prevents image blurring.

The controller is also operative for processing the electrical signal into data indicative of the symbol being read.

The imager may also be associated with an aiming light assembly preferably including one or a plurality of light sources and one or a plurality of pattern shaping optical elements, such as diffractive or refractive optical elements. One or each light source is advantageously a laser. The aiming light assembly is operative for projecting an aiming light pattern on a symbol to target the symbol. The aiming light pattern indicates the overall size of the field of view, but, as discussed above, does not guide the operator to move the reader so that the symbol is at, or in close proximity to, the imaging plane of the imaging lens. The symbol is best read substantially at the imaging plane, because the image of the symbol is sharp and focused substantially at the imaging plane.

In accordance with one feature of this invention, a guiding assembly is supported by the reader and is operatively connected to the controller, for guiding the operator to move the reader to an optimum reading position at which the symbol is located substantially at the imaging plane in the working range. This optimum position occurs when the symbol is at, or in close proximity to, the imaging plane. As described above, the imaging plane is conjugated to the sensor plane, which yields the sharpest image on the array. The image of the symbol at the conjugated distance projected on the array by the imaging lens is the sharpest and has the best possible quality for reading the symbol. Advantageously, the guiding assembly includes a light source and a focusing element, for projecting on the symbol a guiding light pattern that visually indicates the optimum position to the operator.

In one embodiment, the focusing element is a lens, or a plurality of lens elements, for forming the guiding light pattern as a focused, generally circular, light spot at the imaging plane of the imaging lens, and as an unfocused, blurry spot away from the imaging plane of the imaging lens. This embodiment provides visual feedback to the operator in the form of a blur level. When the blur level is minimized, the reader is at the optimum position. In another embodiment, the focusing element is a lens, or a plurality of lens elements, including a non-light-transmissive, circular obscuration at the lens, for forming the guiding light pattern as a focused, generally circular, light spot at the imaging plane of the imaging lens, and as an unfocused, blurry, toroidally shaped light distribution or spot away from the imaging plane of the imaging lens. This embodiment also provides visual feedback to the operator in the form of a blur level and is advantageous over the first-mentioned embodiment, because it is typically easier for the operator to discern the level of blur of a toroid, than that of a circle. In still another embodiment, the guiding assembly includes a pair of light projectors for projecting on the symbol respective guiding light patterns, such as light spots, that overlap to visually indicate the optimum position of the reader, and that are spaced apart to visually indicate that the reader is not at the optimum position.

The method of electro-optically reading symbols located in a range of working distances from a reader advantageously comprises the steps of moving a housing by an operator, capturing light over a field of view from a symbol, optically modifying the captured light for best capture substantially at an imaging plane within the range, generating an electrical signal indicative of the captured light, processing the electrical signal into data indicative of the symbol being read, and guiding the operator to move the housing to an optimum reading position at which the symbol is located substantially at the imaging plane in the working range.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
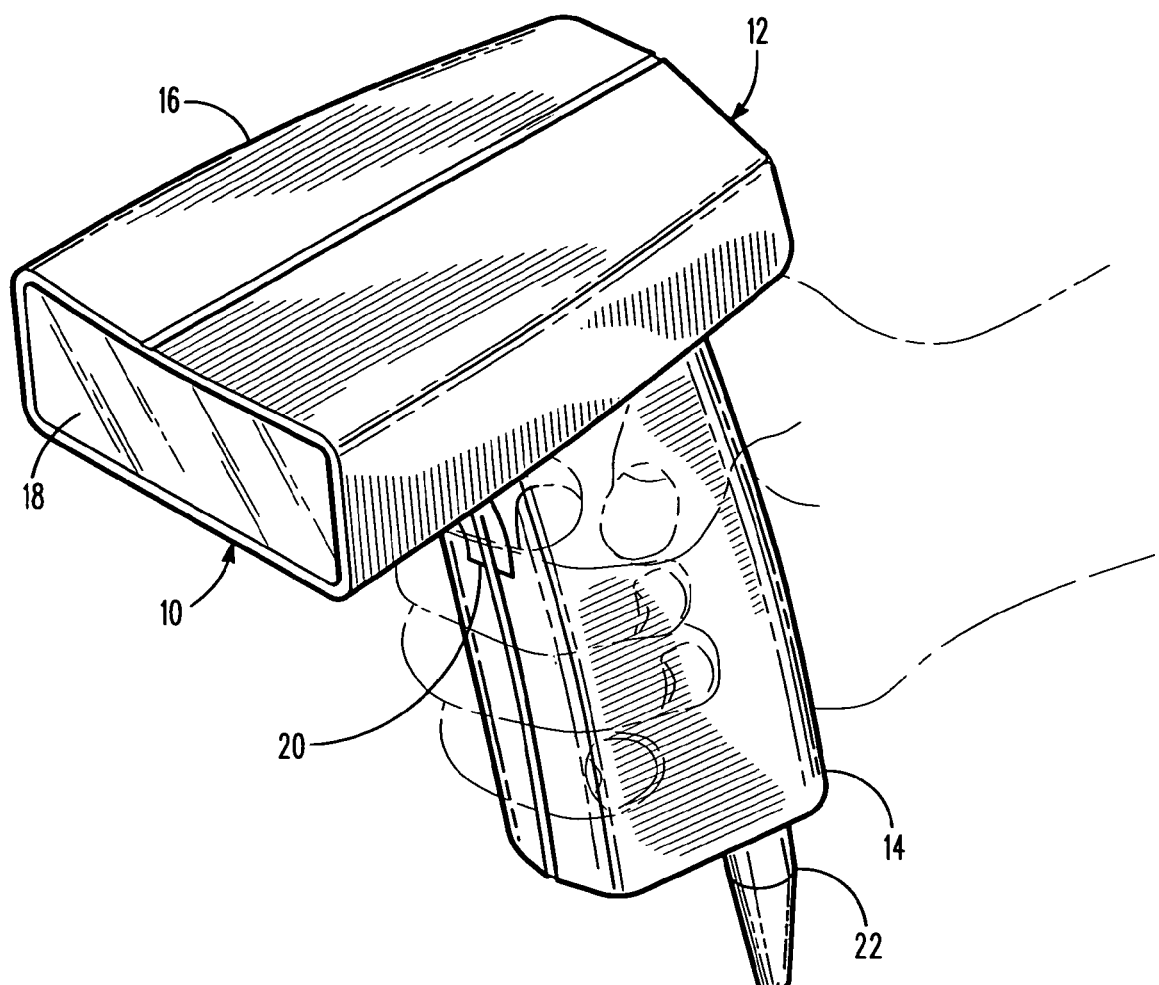
FIG. 1 is a perspective view of an imaging reader for electro-optically reading symbols by image capture.
Figure 1:
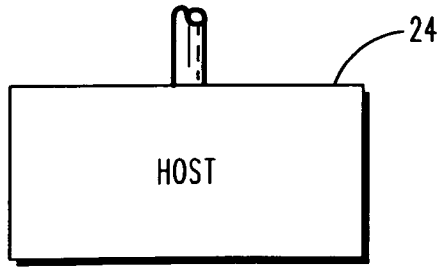

Reference numeral 10 in FIG. 1 generally identifies a hand-held imaging reader for electro-optically reading symbols or like indicia on products or like targets. The reader 10 includes a housing 12 in which a guiding assembly, as described in detail below in accordance with this invention, is incorporated. The housing 12 includes a generally elongated handle or lower handgrip portion 14 and a barrel or upper body portion 16 having a front end at which a light-transmissive window 18 is located. The cross-sectional dimensions and overall size of the handle are such that the reader can conveniently be held in an operator's hand.

The body and handle portions may be constructed of a lightweight, resilient, shock-resistant, self-supporting material such as a synthetic plastic material. The plastic housing may be injection molded, but can be vacuum-formed or blow-molded to form a thin hollow shell which bounds an interior space whose volume is sufficient to contain the various components of this invention.

A manually actuatable trigger 20 is mounted in a moving relationship on the handle 14 in a forward facing region of the reader. The operator's forefinger is used to actuate the reader to initiate reading by depressing the trigger. An optional flexible electrical cable 22 is provided to connect the reader to a remote host 24. The cable may also provide electrical power to the reader. The host 24 has access to a database for retrieval of information. If the cable 22 is not used, then a wireless link to transfer data may be provided between the reader 10 and the host 24, and an on-board battery, typically within the handle, can be used to supply electrical power.

An alternative embodiment incorporates a display and a keyboard. Data obtained from reading the symbols is then either transferred to the remote host 24 in real time, or saved to an internal memory such that the stored data can be transferred to the host 24 at a later time in batch mode.

Figure 2:
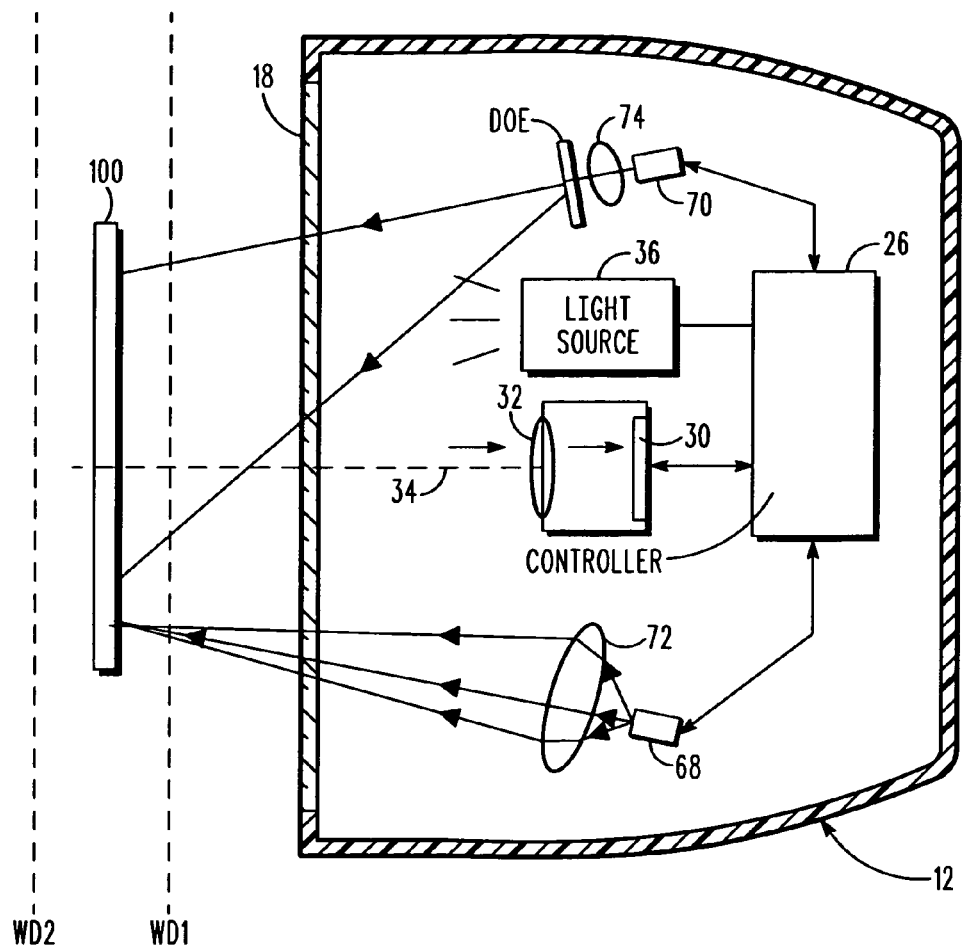
FIG. 2 is a diagrammatic plan view of components within the reader of FIG. 1 including components of a guiding assembly in accordance with this invention.

An imaging assembly includes a solid-state imager 30, as shown in the interior plan view of FIG. 2, and an imaging lens 32, both mounted within the housing 12. The imager 30 preferably is a one- or two-dimensional, charge coupled device (CCD) array or a complementary metal oxide semiconductor (CMOS) array of cells or sensors lying in a sensor plane and operative for capturing light over its field of view from a product bearing a symbol 100 through the window 18.

The imaging lens 32 preferably comprises one or more lenses having an imaging plane at which the symbol 100 is best focused and imaged onto the imager 30. As described above, the imaging plane is conjugated to the sensor plane, which yields the sharpest image on the array. The image of the symbol 100 at the conjugated distance projected on the array by the imaging lens 32 is the sharpest and has the best possible quality for reading the symbol 100. The sensors produce electrical signals corresponding to a one- or two-dimensional array of pixel information for an image of the symbol 100. The electrical signals are processed by a controller or microprocessor 26 into data indicative of the symbol 100 being read. The imager 30 and imaging lens 32 are preferably aligned along a centerline or an optical axis 34 generally centrally located within the body portion 16.

As shown in FIG. 2, the imaging lens 32 has a fixed focus and enables image capture over a range of working distances between a close-in distance WD1 and a far-out distance WD2 relative to the window 18. Optimum capture occurs substantially at the imaging plane. The imager 30 and imaging lens 32 are capable of acquiring a full image of the symbol in lighting conditions from two lux to direct sunlight. Exposure time is about 15 milliseconds and controlled by the controller 26. Resolution of the array can be of various sizes although a VGA resolution of 640×480 pixels is preferred.

An illumination or light source 36 for the imager 30 is also provided to provide an illumination field for the imager. The source 36 preferably constitutes one or a plurality of light emitting diodes energized by power supply lines in the cable 22, or via the on-board battery. The source 36 is preferably pulsed in synchronism with the imager 30 under the control of the controller 26.

An aiming light assembly is supported by the housing 12, and is operative for projecting on the symbol 100 an aiming light pattern, for example, a generally circular spot or crosshairs for placement at the center of the symbol. Other aiming light patterns for framing the symbol are contemplated. The aiming light assembly includes at least one light projector that includes a light source, such as a laser 70, a focusing lens 74, and a pattern shaping optical element, such as a diffractive optical element (DOE) 78, or a refractive optical element (ROE). The focused light passing through a respective DOE forms multiple diverging beamlets, as described in U.S. Pat. No. 6,340,114, which exit the window 18 and project continuous lines or rows of spots arrayed in the aiming light pattern on the symbol 100 to indicate the field of view of the imager 30.

As described so far, even though the aiming light pattern may indicate the overall size of the field of view, many operators still have difficulty using the described handheld movable reader 10, because they cannot see exactly whether the symbol 100 is located at the imaging plane for best reading within the working range. The symbol must lay not only within the field of view, but also substantially at the imaging plane, which yields the best quality image within the working range, to be successfully and rapidly imaged, decoded and read. It is not uncommon for the operator to repeatedly move the portable reader 10 in multiple side-to-side, up-and-down, and back-and-forth, directions and repeatedly aim the portable reader 10 at a single symbol several times before an indicator advises the operator that the symbol has been successfully imaged and read, thereby slowing down transaction processing and reducing productivity.

Figure 3:
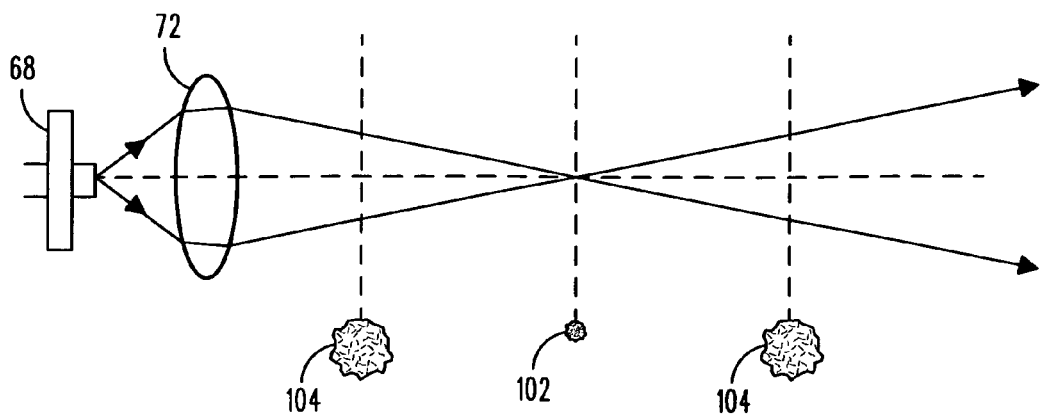
FIG. 3 is a diagrammatic view of one embodiment of the guiding assembly of FIG. 2.

In accordance with this invention, a guiding assembly is supported by the housing 12 and is operatively connected to the controller 26, for guiding the operator to move the reader 10 to an optimum reading position at which the symbol 100 is located substantially at the imaging plane in the working range. Advantageously, in one embodiment, the guiding assembly includes a light source 68, such as a laser or a light emitting diode (LED), and a focusing element 72, for projecting on the symbol 100 a guiding light pattern that visually indicates the imaging plane to the operator. More particularly, as shown in FIG. 3, the focusing element 72 is a lens, or a plurality of lenses, for forming the guiding light pattern as a focused, generally circular, light spot 102 at the imaging plane of the imaging lens 32, and as an unfocused, blurry spot 104 away from the imaging plane. This embodiment provides visual feedback to the operator in the form of a blur level. When the blur level is minimized, the reader is at the optimum position.

Figure 4:
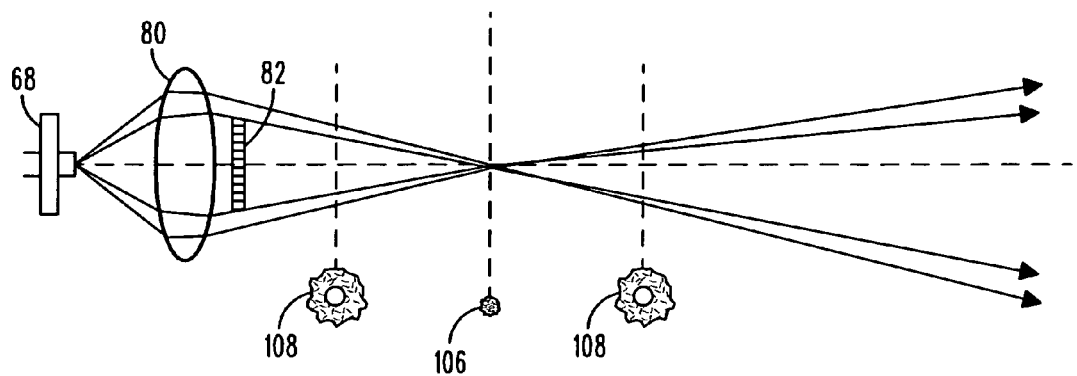
FIG. 4 is a diagrammatic view of another embodiment of the guiding assembly of FIG. 2.

In another embodiment, as shown in FIG. 4, the focusing element is a lens 80, or a plurality of lenses, including a non-light-transmissive, generally circular, obscuration 82 at the lens 80, preferably at the center of the lens 80, for forming the guiding light pattern as a focused, generally circular, light spot 106 at the imaging plane of the imaging lens 32, and as an unfocused, blurry, toroidally- or doughnut-shaped light distribution or spot 108 away from the imaging plane. The obscuration 82 may be a discrete element, such as an opaque plate or mask. Preferably, the obscuration 82 is a opaque circular layer that is coated onto the lens 80. This embodiment also provides visual feedback to the operator in the form of a blur level and is advantageous over the first-mentioned embodiment, because it is typically easier for the operator to discern the level of blur of a toroid, than that of a circle. Thus, the central circular area of the toroidal spot 108 is dark, whereas the outer ring-shaped area is colored, for example, red, in the event that the light source 68 emits visible red light.

Figure 5:
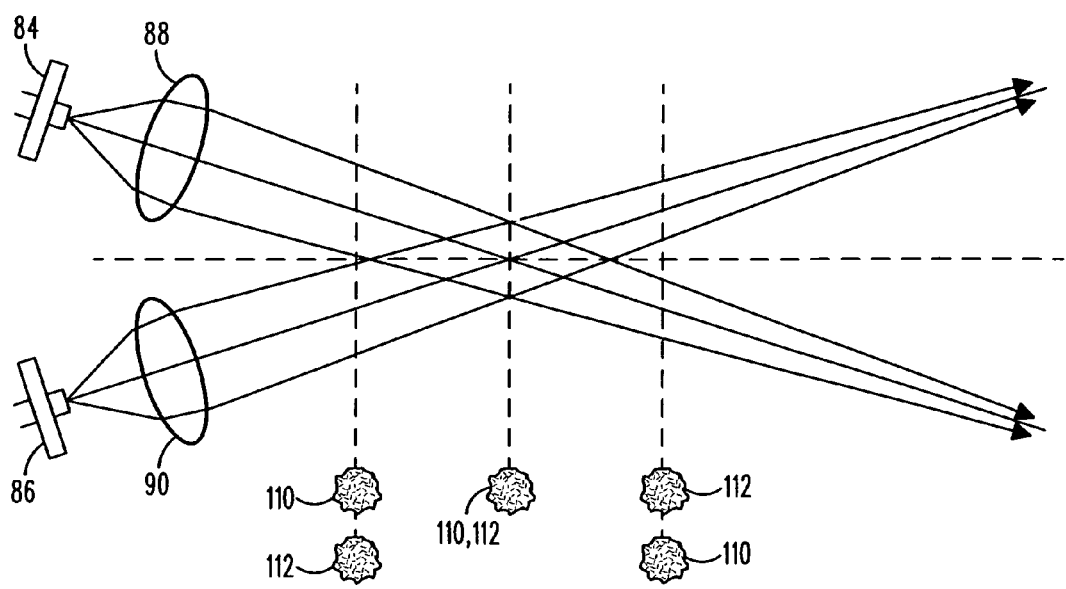
FIG. 5 is a diagrammatic view of still another embodiment of the guiding assembly of FIG. 2.

In still another embodiment, as shown in FIG. 5, the guiding assembly includes a pair of light projectors, including light sources 84, 86 and focusing lenses 88, 90, or a plurality of lenses, for projecting along respective inclined paths on the symbol 100 respective guiding light patterns, such as light spots 110, 112, that overlap to visually indicate the imaging plane, and that are spaced apart to visually indicate that the reader is not at the imaging plane.

In use, the operator points the reader 10 at the symbol 100 to be read and manually depresses the trigger 20 to initiate reading. The controller 26 activates the imager 30, the aiming laser 70, and the light source 68. If the operator sees that the guiding light pattern is blurry like that shown by spots 104, 108 in FIGS. 3-4, or if the operator sees that the guiding light pattern is a pair of spaced-apart spots like that shown by spots 110, 112 in FIG. 5, then the operator will move the reader 10 away from or toward the symbol 100. Once the symbol is substantially entirely within the field of view, as determined by the aiming light pattern, and substantially at the imaging plane, as determined by the guiding light pattern, then the controller 26 activates the illumination source 36, and the illuminated symbol can be successfully decoded by the controller 26, and an indicator will so advise the operator. Preferably, the aiming laser 70 is deactivated during the reading of the symbol.

Rather than using a separate aiming assembly and a separate guiding assembly, this invention also proposes combining them into a single operative assembly that not only generates the aiming light pattern to frame the field of view, but also guides the operator by making the aiming light pattern sharp and focused substantially at the imaging plane, and blurry and unfocused at all other distances within the range of working distances. One way to achieve this is to provide the aiming assembly with a large numerical aperture.

As described so far, the focusing lenses 72, 80, 88, 90 have a fixed focus. This invention also proposes configuring these lenses with a variable focus, either by moving a respective lens, or preferably by configuring them as variable focus liquid lenses of the type described in U.S. Pat. No. 7,201,318, or of the type described in U.S. patent application Ser. No. 12/005,977, filed Dec. 27, 2007, the entire contents said patent and application being hereby incorporated by reference herein.

When a variable focusing lens is used, its focal length is controlled by the controller 26 such that the guiding light pattern is sharpest and best focused substantially at the imaging plane, and unfocused away from the imaging plane. The distance between the imaging assembly and the symbol can be used to control the focal length of the variable focusing lens. This distance can be determined in various ways. For example, a rangefinder supported by the reader can be used. Also, the imager 30 can be used, together with the controller 26, to measure the blur level of a captured image. The level of blur is a measure of the distance between the imaging assembly and the symbol. Still another way is to acquire a database of images in and out of focus at various distances within the working range, and then acquire gradient histograms of these images, and use pattern recognition algorithms that will map between the gradient histograms and the various positions.

It will be understood that each of the elements described above, or two or more together, also may find a useful application in other types of constructions differing from the types described above. Thus, readers having different configurations can be used. Also, different guiding patterns can be employed.

While the invention has been illustrated and described as employing a guiding light pattern projected from an imaging reader to indicate an optimum reading position at which to read symbols or like targets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading symbols located in a working range of distances from the reader, comprising:
    a housing movable by an operator;
    an imaging assembly supported by the housing, for capturing light over a field of view from a symbol, for optically modifying the captured light for optimum capture at an imaging plane, and for generating an electrical signal indicative of the captured light;
    a controller supported by the housing, for processing the electrical signal into data indicative of the symbol being read;
    a guiding assembly supported by the housing and operatively connected to the controller, for guiding the operator to move the housing to an optimum reading position at which the symbol is located substantially at the imaging plane in the working range; and
    wherein the focusing element is a lens including a non-light-transmissive obscuration at the lens, for forming the guiding light pattern as a focused, generally circular, light spot at the optimum position, and as an unfocused, blurry, toroidal spot away from the optimum position.

2. The reader of claim 1, wherein the guiding assembly includes a light source and a focusing element, for projecting on the symbol a guiding light pattern that visually indicates the optimum position to the operator.

3. The reader of claim 1, wherein the imaging assembly includes one of a solid-state, charge coupled device and a complementary metal oxide silicon device, and an imaging lens.

4. A method of electro-optically reading symbols located in a working range of distances from a reader, comprising the steps of:
    moving the reader by an operator;
    capturing light over a field of view from a symbol, optically modifying the captured light for optimum capture at an imaging plane, and generating an electrical signal indicative of the captured light;
    processing the electrical signal into data indicative of the symbol being read;
    guiding the operator to move the reader to an optimum reading position at which the symbol is located substantially at the imaging plane in the working range; and
    wherein the projecting step is performed by focusing the guiding light pattern as a focused, generally circular, light spot at the optimum position, and as an unfocused, blurry, toroidal spot away from the optimum position.

5. The method of claim 4, wherein the guiding step is performed by projecting on the symbol a guiding light pattern that visually indicates the optimum reading position to the operator.

6. The method of claim 4, and wherein the step of capturing the light is performed by one of a charge coupled device and a complementary metal oxide silicon device, and wherein the step of modifying the light is performed by a focusing lens.

* * * * *